United States Patent [19]
Biren et al.

[11] 3,714,620
[45] Jan. 30, 1973

[54] SONIC AIRCRAFT/VEHICLE DISCRIMINATOR

[75] Inventors: Steven Biren, Glen Oaks; Thomas V. Costello, Bronx, both of N.Y.

[73] Assignee: The United States of America as represented by the Secretary of the Navy

[22] Filed: Dec. 18, 1970

[21] Appl. No.: 99,404

[52] U.S. Cl................340/15, 340/16 R, 340/261
[51] Int. Cl..............................................H04b 11/00
[58] Field of Search........340/5 R, 6 R, 15, 16 R, 261

[56] References Cited

UNITED STATES PATENTS 2,907,012  9/1959  Pitman et al......................340/5 R X
3,147,467  9/1964  Laakmann..........................340/261
3,564,493  2/1971  Hicklin..............................340/15

Primary Examiner—Richard A. Farley
Attorney—R. S. Sciascia and Henry Hansen

[57] ABSTRACT

A sonic aircraft/vehicle discriminator adapted to receive sonic signals from both aircraft and land motor vehicles provides an output signal on receiving aircraft signals and a null on receiving the vehicle signals. The system by detecting slower fluctuations and less variations in the amplitudes of the vehicle signals than the aircraft signals subsequently attenuates the vehicle signals. The discriminator is comprised of serially connected filters, amplifiers, envelope detector, differentiator, integrator and Schmitt trigger.

4 Claims, 1 Drawing Figure

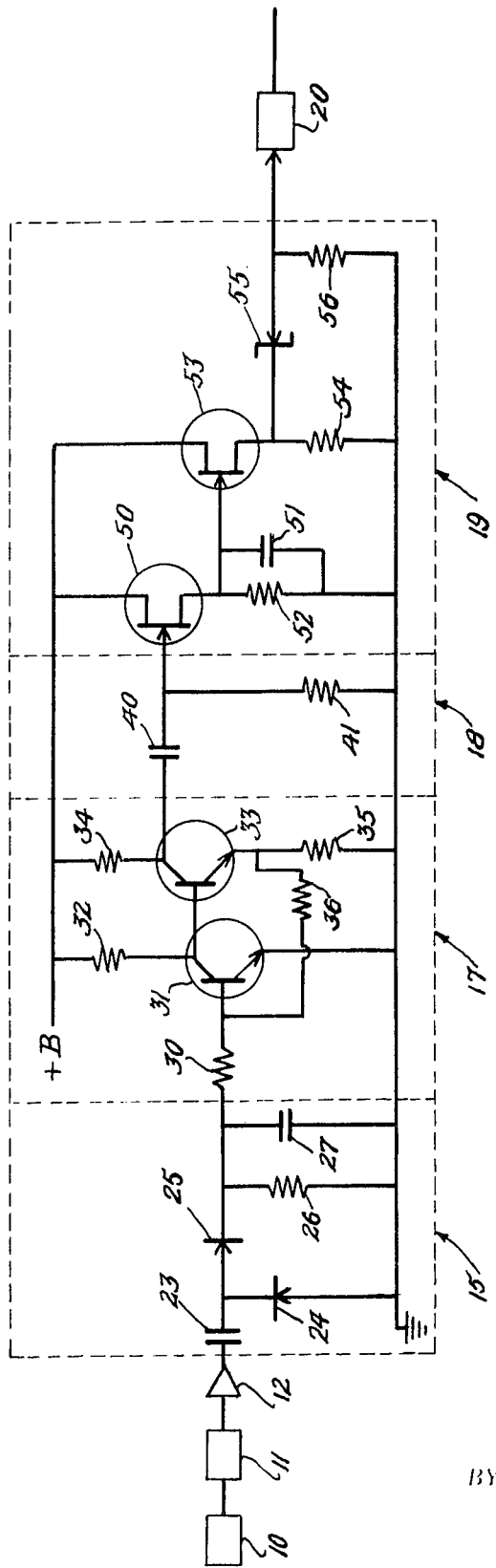

3,714,620

SONIC AIRCRAFT/VEHICLE DISCRIMINATOR

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

The system generally relates to discriminator between a plurality of applied signals and more particularly to the discrimination between the electrical signals generated by a transducer receiving acoustic signals provided by aircraft and ground motor vehicles.

The need for systems to provide discrimination between motor vehicles and aircraft is relatively new. U.S. Pat. application Ser. No. 756,350, filed Aug. 28, 1968 by W. L. Hicklin and now U.S. Pat. No. 3,564,493 fully explains a use for such systems. Briefly stated, the discriminator system may be used to provide a signal to a control unit. The control unit is part of a sound detection device that has a transmitter for sending received signals meeting specified criteria to a remote station. Upon receipt of a signal from the discriminator system that indicates the presence of aircraft, the transmitter is blanked as it is undesirable to transmit such signals. The above-mentioned control unit, sound detection device and transmitter form no part of the present invention.

A known prior art device for detecting the presence of aircraft uses complex automatic gain control circuitry for determining the approach of an aircraft or motor vehicle and in addition has a peak-to-peak detector to aid in determining whether the detected sound is that of an aircraft. The output of the peak-to-peak detector is supplied to an integrator that provides the output signal of the device.

SUMMARY OF THE INVENTION

Accordingly, it is a purpose of the present invention to provide an aircraft/vehicle discriminator with a high degree of reliability and a system of less complexity than those that heretofore have been known.

This is accomplished by providing a filter in the input electrical system to pass only those signals known to be present in an aircraft or land motor vehicle and providing an envelope detector to the signals received. These signals are further amplified and applied to a differentiator which blocks the electrical signals attributed to land motor vehicles and provides passage to the more rapidly fluctuating aircraft signals. The aircraft signals are then applied to an integrator circuit and the signals upon reaching a predetermined magnitude are passed through a zener diode and fire a Schmitt trigger that provides a constant output signal.

BRIEF DESCRIPTION OF THE DRAWING

The FIGURE is a schematic block diagram of an embodiment of the present invention.

DESCRIPTION OF THE PREFERRED EMBODIMENT

Referring now to the FIGURE there is shown a microphone 10 that receives an input acoustic signal and converts the signal to an electrical output that is applied to a filter 11. The filter 11 is a bandpass filter that provides for passing only frequencies within the 30 to 40 Hz. range. The output of filter 11 is applied to an amplifier 12 that amplifies the applied signal. Amplifier 12 is connected to an envelope detector 15 with a charging time constant of 5 milliseconds and a discharge time constant of 25 milliseconds, which detects the amplitude envelope of the applied signal and flattens out extreme excursions within the signal. In addition the envelope detector has rectifying diodes so that signals of only one polarity are passed. A second amplifier 17 is connected to the output of envelope detector 15 and provides an amplified signal to a differentiator circuit with a time constant of 470 microseconds. The output of the differentiator 18 is applied to an integrator 19 with a time constant of 8.5 seconds. The output of the integrator circuit is applied to a Schmitt trigger and the Schmitt trigger fires on receiving an output signal indicating the presence of aircraft in the vicinity.

Specific circuits within the discriminator are shown in schematic form including the envelope detector 15, amplifier 17, differentiator 18 and integrator 19. The signal from amplifier 12 is applied to the envelope detector 15 that includes a capacitor 23 that has its output connected to the cathode of diode 24 and the anode of diode 25. The anode of diode 24 is connected to ground and the cathode of diode 25 is connected to ground through the parallel combination of resistor 26 and capacitor 27. The cathode of diode 25 is also connected to amplifier 17. This connection is to the base of NPN transistor 31 through a resistor 30. The collector of transistor 31 is connected to a plus voltage supply +B through a resistor 32 and the emitter of the transistor 31 is grounded. In addition the collector of transistor 31 is connected to the base of NPN transistor 33 whose emitter is connected to ground through a resistor 35. The emitter of transistor 33 provides a feedback to the base of transistor 31 through a resistor 36. The collector of transistor 33 is connected to the +B voltage supply through a resistor 34. The output of transistor 33 is applied to the differentiator network 18 comprising the series connected capacitor 40 and a shunt resistor 41 at the output of the capacitor 40 connected to ground. The output of capacitor 40 is also connected to the integrator 19. A field effect transistor 50 within integrator 19 receives at its gate electrode the output of capacitor 40. The source electrode of transistor 50 is connected is connected to the +B voltage supply and the drain electrode is connected to ground through the parallel connection of a resistor 52 and a capacitor 51. The drain electrode of FET 50 is in addition connected to the gate electrode of FET 53. The source electrode of FET 53 is connected to the +B voltage supply and the drain electrode is connected to ground through a resistor 54. The drain electrode of FET 53 is in addition connected to zener diode 55 whoch output terminal is connected to ground through a resistor 56. The output of terminal of zener diode 55 is in addition connected to Schmitt trigger 20.

The operation of the device will now be described with reference to the FIGURE. The microphone 10 senses acoustic signals and supplies electrical signals indicative of the received acoustic signals to filter 11. The filter 11 with a bandwidth of 30 to 40 Hz. passes both aircraft and vehicle signals as their acoustic frequency is predominantly within this range. The output of filter 11 is supplied to the feedback pair amplifier 12 which is identical to amplifier 17 that was described above and shown in the FIGURE. The output of amplifier 12 is applied to envelope detector 15 whose diode 24 shunts the negative portion of the signal to ground and whose diode 25 passes the positive portion of the signal. In addition the envelope detector provides an output that is the envelope of the amplitude of the received signals with extreme voltage excursions smoothed out. The output of the detector 15 is applied to the feedback pair amplifier 17 that amplifies the applied signal and supplies it to differentiator network 18 that has a capacitor 40 that blocks the envelope variations of motor vehicles but passes the more severe aircraft envelope variations as experiments have determined that the aircraft envelope signals have more rapid and severe variations than the motor vehicles envelope signals. The output of the differentiator 18 is then applied to integrator circuit 19. The integrator circuit has a time constant of 8.5 seconds so that only the relatively frequent amplitude variations of an aircraft will charge the integrating circuit 19. The integrator circuit 19 in addition contains a zener diode 55 which passes an output signal only when the amplitude of the applied signal exceeds a predetermined magnitude. The output of the zener diode is then applied to a Schmitt trigger 20 which is set to fire upon receipt of a signal from the zener diode 55. The voltage amplitude of the firing point of the Schmitt trigger 20 is set below that of the zener diode 55.

An output from the Schmitt trigger 20 determines the presence of aircraft in the vicinity. Such signal may be applied to a transmitter (not shown) for blanking the transmitter as has been done previously and is well known in the art. In addition this signal could be used for superimposing another signal upon the signal being transmitted so that one at a remote station could determine the presence of aircraft without blanking the signal.

It has therefore been shown a means for discriminating between aircraft and land motor vehicle sounds by means of filtering the received signal amplifying the signal, providing a signal that is the envelope of the signal, providing a signal that is the envelope of the signal. The signal then has extreme variations removed and is then differentiated and integrated. When the output of the integrator exceeds a predetermined magnitude a zener diode breaks down and applies a signal to a Schmitt trigger. The Schmitt trigger then provides an output signal of constant amplitude indicating the presence of aircraft in the vicinity. This signal may then be used for whatever further processing is desired such as blanking out a transmitter that is transmitting both aircraft and vehicle sounds so that only the vehicle sounds are transmitted.

It will be understood that various changes in the details, materials, steps and arrangements of parts, which have been herein described and illustrated in order to explain the nature of the invention, may be made by those skilled in the art within the principle and scope of the invention as expressed in the appended claims.

What is claimed is:

1. An aircraft/vehicle discriminator comprising:

filter means adapted to receive an electrical signal indicative of an acoustic sound for passing only those signals within a predetermined frequency range;

detector means operatively connected to the output of said filter means for detecting the envelope of said filter means output signal and for rectifying the detected signal including a first diode connected to receive the output of said filter means and providing a shunt to ground for signals of a predetermined polarity, a second diode connected to the output of said filter means for providing a path for filter means output signals of the other polarity, and a resistive-capacitive network adapted to receive the output of said second diode for smoothing out the signal from said second diode and providing an output that is an envelope of the output of said second diode;

differentiator means operatively connected to the output of said detector means for providing an output whose amplitude is a function of the slope of the output of said detector means including a capacitor operatively connected to the output of said detector means, and a grounded resistor connected to the output of said capacitor;

integrator means adapted to receive the output of said differentiator means for providing an output upon reaching a predetermined amplitude that is a function of the integral of the output of said differentiator means including a pair of cascaded field effect transistors, a resistive-capacitive parallel network connected to the drain of one of said cascaded field effect transistors, and a zener diode connected to the output of said pair of cascaded field effect transistors; and a Schmitt trigger operatively connected to the output of said integrator means for providing an output indicative of whether the output of said integrator means has exceeded said predetermined amplitude.

2. An aircraft/vehicle discriminator according to claim 1 further comprising:

a first amplifier interposed between said filter means and said detector means; and a second amplifier interposed between said detector means and said differentiator means.

3. An aircraft/vehicle discriminator according to claim 2 wherein said first and second amplifiers further comprise:

a first and second NPN transistor connected in cascade; and a resistive network connected between the base of said first transistor and the emitter of said second transistor 4. A device for discriminating between signals comprising:

detector means adapted to receive a signal for detecting the envelope of the signal and for rectifying the detected signal including a first diode connected to receive the signals and provide a shunt to ground for signals of a predetermined polarity, a second diode connected to the output of said first diode for providing a path for signals of the other polarity, and a resistive-capacitive network adapted to receive the output of said second diode for smoothing out the signal from said second diode and providing an output that is an envelope of the output of said second diode;

differentiator means operatively connected to the output of said detector means for providing an output whose amplitude is a function of the slope of the output of said detector means including a capacitor operatively connected to the output of said detector means, and a grounded resistor connected to the output of said capacitor;

integrator means adapted to receive the output of said differentiator means for providing an output upon reaching a predetermined amplitude that is a function of the integral of the output of said differentiator means including a pair of cascaded field effect transistors, a resistive-capacitive parallel network connected to the drain of one of said cascaded field effect transistors, and a zener diode connected to the output of said pair of cascaded field effect transistors; and a Schmitt trigger operatively connected to the output of said integrator means for providing an output indicative of whether the output of said integrator means has exceeded said predetermined amplitude.

\* \* \* \* \*